United States Patent
Barger

(10) Patent No.: US 11,613,684 B1
(45) Date of Patent: Mar. 28, 2023

(54) METHOD OF PRODUCING, SYSTEM FOR PRODUCING, AND COMPOSITION OF DEICING BRINES WITHOUT CRYSTALLIZATION

(71) Applicant: City of Lincoln, Nebraska, Lincoln, NE (US)

(72) Inventor: Ty L. Barger, Lincoln, NE (US)

(73) Assignee: City of Lincoln, Nebraska, Lincoln, NE (US)

( * ) Notice: Subject to any disclaimer, the term of this patent is extended or adjusted under 35 U.S.C. 154(b) by 1009 days.

(21) Appl. No.: 16/371,321

(22) Filed: Apr. 1, 2019

Related U.S. Application Data

(62) Division of application No. 15/383,616, filed on Dec. 19, 2016, now Pat. No. 10,253,230.

(60) Provisional application No. 62/268,855, filed on Dec. 17, 2015.

(51) Int. Cl.
  *C09K 3/18* (2006.01)
  *B01F 23/40* (2022.01)
  *B01F 35/22* (2022.01)

(52) U.S. Cl.
  CPC .............. *C09K 3/185* (2013.01); *B01F 23/40* (2022.01); *B01F 35/2205* (2022.01)

(58) Field of Classification Search
  CPC ....... C09K 3/185; B01F 23/40; B01F 35/2205
  USPC ......................................................... 700/266
  See application file for complete search history.

(56) References Cited

U.S. PATENT DOCUMENTS

| | | | | |
|---|---|---|---|---|
| 6,080,330 A ‡ | 6/2000 | Bloomer | ................ | C09K 3/185 106/13 |
| 6,226,846 B1 | 5/2001 | Watson et al. | | |
| 6,582,622 B1 ‡ | 6/2003 | Hartley | .................... | C09K 3/18 106/13 |
| 6,596,188 B1 ‡ | 7/2003 | Hartley | ................. | C09K 3/185 106/13 |
| 6,770,217 B2 ‡ | 8/2004 | Hartley | ................. | C09K 3/185 106/13 |
| 6,858,826 B2 | 2/2005 | Mueller et al. | | |
| 7,014,789 B2 ‡ | 3/2006 | Hartley | .................... | C09K 3/18 106/13 |
| 8,226,846 B2 ‡ | 7/2012 | Hartley | ................. | C09K 3/185 106/13 |
| 8,858,826 B2 ‡ | 10/2014 | Sapienza | .................. | C09K 3/18 106/13 |
| 9,133,378 B2 ‡ | 9/2015 | Maslow | ................. | C09K 3/185 |
| 2007/0025179 A1* | 2/2007 | Hildreth | ............. | B01F 35/2205 366/136 |

(Continued)

OTHER PUBLICATIONS

Alkar-RapidPak, Inc., "Sodium Chloride Brine Tables for 60° F. (15.5° C.)", Dec. 9, 2015, 2 pages.‡

(Continued)

*Primary Examiner* — Marc C Howell
(74) *Attorney, Agent, or Firm* — Suiter Swantz pc llo

(57) ABSTRACT

A system may include a non-transitory computer readable medium and a processor communicatively coupled to the non-transitory computer readable medium. The processor may be configured to execute instructions to perform a method to produce a deicing brine blend. The deicing brine blend may be crystallization-free at least until the deicing brine blend is below 10 degrees Fahrenheit.

15 Claims, 4 Drawing Sheets

(56) References Cited

U.S. PATENT DOCUMENTS

| | | | | |
|---|---|---|---|---|
| 2009/0092001 | A1* | 4/2009 | Hildreth | B01F 25/53 366/132 |
| 2013/0094324 | A1* | 4/2013 | Hildreth | B01F 35/2202 366/152.4 |
| 2015/0273417 | A1* | 10/2015 | Hildreth | B01F 23/59 366/152.6 |

OTHER PUBLICATIONS

Barger, Ty et al., "Customizing brine", Roads & Bridges, http://www.roadsbridges.com/customizing-brine, Sep. 2, 2015, 10 pages.‡

Chemical Solutions, Inc., "Liquid Calcium Chloride—MeltSnow.com—Home of Liquid Calcium Chloride for Ice Melting, Snow Melting", BioBrine CCtm, http://meltsnow.com/products/calcium-chloride/liquidcalcium-chloride/, Dec. 9, 2015, 3 pages.‡

EnviroTech Services, Inc., "MeltDown Apex™", http://hs.envirotechservices.com/meltdown-liquid-antiicing-and-deicing, Dec. 9, 2015, 3 pages.‡

Florachem, Floramask™ PT-WS, "Brine Recipes", Apr. 23, 2015, 1 page.‡

Occidental Chemical Corporation, "Premixing Brine Blends", Calcium Chloride Highway Ice Melting, http://www.oxycalciumchloride.com/highway-ice-melting/best-practices/application-best, Dec. 9, 2015, 1 page.‡

Occidental Chemical Corporation (OxyChem), "Physical Properties of Calcium Chloride", Calcium Chloride A Guide to Physical Properties, www.oxycalciumchloride.com, 12 pages.‡

Occidental Chemical Corporation, "LIQUIDOW™ Technical Grade Calcium Chloride Solution", http://www.oxycalciumchloride.com/products/liquidow-technical-grade-calcium-chloride, Dec. 9, 2015, 1 page.‡

Properties of Sodium Chloride Solutions, Data at 60 F, Dec. 11, 2016, 1 page.‡

Salter, Peter, "Hitting the streets next winter: A more refined brine", JournalStar.com, http://journalstar.com/news/local/hitting-the-streets-next-winter-a-more-refined-brine, May 10, 2015, 4 pages.‡

Salter, Peter, "Lincoln to use new melting method this winter", JournalStar.com, http://www.washingtontimes.com/news/2014/sep/20/lincoln-to-use-n., Dec. 9, 2015, 3 page.‡

Salter, Peter, "City to season slick streets with salt, sugar beet solution", JournalStar.com, Sep. 12, 2014 http://journalstar.com/news/local/govt-and-politics/article_d6ac2a0d-1070-5339-816d-241, 4 pages.‡

SFG Smith Fertilizer & Grain, "BEET 55®", http://sfgiowa.com/beet-55, Dec. 9, 2015, 2 pages.‡

SFG Road Maintenance Guide, "Beet 55™ & Husker Plus™", sfgiowa.com, Dec. 11, 2016, 12 pages.‡

The Dow Chemical Company, "A Guide to Properties, Forms, Storage and Handling", Calcium Chloride Handbook, www.dowcalciumchloride.com, Aug. 2003, 28 pages.‡

Wikipedia, "Eutectic system", https://en.wikipedia.org/wiki/Eutectic_system, Dec. 11, 2016, 6 pages.‡

Alkar-RapidPak, Inc., "Sodium Chloride Brine Tables for 60.degree. F. (15.5.degree. C.)", Dec. 9, 2015, 2 pages.

EnviroTech Services, Inc., "MeltDown Apex.TM.", http://hs.envirotechservices.com/meltdown-liquid-antiicing-and-deicing, Dec. 9, 2015, 3 pages.

Florachem, Floramask.TM. PT-WS, "Brine Recipes", Apr. 23, 2015, 1 page.

Occidental Chemical Corporation, "Liquidow.TM. Technical Grade Calcium Chloride Solution", http://www.oxycalciumchloride.com/products/liquidow-technical-grade-calci- um-chloride, Dec. 9, 2015, 1 page.

SFG Smith Fertilizer & Grain, "Beet 55.RTM.", http://sfgiowa.com/beet-55, Dec. 9, 2015, 2 pages.

SFG Road Maintenance Guide, "Beet 55.TM. & Husker Plus.TM.", sfgiowa.com, Dec. 11, 2016, 12 pages.

\* cited by examiner
‡ imported from a related application

METHOD OF PRODUCING, SYSTEM FOR PRODUCING, AND COMPOSITION OF DEICING BRINES WITHOUT CRYSTALLIZATION

CROSS-REFERENCE TO RELATED APPLICATIONS

This application claims the benefit of U.S. patent application Ser. No. 15/383,616, filed on Dec. 19, 2016, which claims the benefit of U.S. Provisional Application No. 62/268,855, filed on Dec. 17, 2015, all of which are hereby expressly incorporated herein in their entirety.

BACKGROUND

Typically, below a particular temperature, solutions containing both sodium chloride (NaCl) and other solutes (such as calcium chloride ($CaCl_2$)) and/or magnesium chloride ($MgCl_2$)) begin to precipitate crystallized salt; an amount of such crystallization increases both with higher salt concentrations and with lower temperatures, and crystallization may not be apparent until the temperature of the brine blend is reduced to a threshold temperature. When crystallization occurs, this salt crystallization renders brine delivery equipment inoperative as the crystallization may obstruct pumps, hoses, nozzles, and/or the like. Currently, to avoid crystallization problems, deicing service providers in the industry rely on a combination of less effective deicers and infrastructure-destroying chemicals.

SUMMARY

In one aspect, embodiments of the inventive concepts disclosed herein are directed to a deicing brine blend prepared by a process. The process may include providing an amount of sodium chloride component solution, the amount of sodium chloride component solution having a specific gravity of approximately between 1.179 and 1.156. The process may include providing an amount of calcium chloride component solution, the amount of calcium chloride component solution having a specific gravity of approximately 1.294. The process may include providing an amount of a sugar additive component solution. The process may include mixing at least the amount of sodium chloride component solution, the amount of calcium chloride component solution, and the amount of a sugar additive to produce the deicing brine blend. The deicing brine blend may be crystallization-free at least until the deicing brine blend is below 10 degrees Fahrenheit.

In a further aspect, embodiments of the inventive concepts disclosed herein are directed to a method of producing a deicing brine blend. The method may include providing an amount of sodium chloride component solution, the amount of sodium chloride component solution having a specific gravity of approximately between 1.179 and 1.156. The method may include providing an amount of calcium chloride component solution, the amount of calcium chloride component solution having a specific gravity of approximately 1.294. The method may include providing an amount of a sugar additive component solution. The method may include mixing at least the amount of sodium chloride component solution, the amount of calcium chloride component solution, and the amount of a sugar additive to produce the deicing brine blend. The deicing brine blend may be crystallization-free at least until the deicing brine blend is below 10 degrees Fahrenheit.

In a further aspect, embodiments of the inventive concepts disclosed herein are directed to a system for producing a deicing brine blend. The system may include a non-transitory computer readable medium and a processor communicatively coupled to the non-transitory computer readable medium. The processor may be configured to execute instructions to perform a method to produce a deicing brine blend. The deicing brine blend may be crystallization-free at least until the deicing brine blend is below 10 degrees Fahrenheit.

In a further aspect, embodiments of the inventive concepts disclosed herein are directed to a deicing brine blend. The deicing brine blend may consist essentially of water, dissolved sodium chloride, dissolved calcium chloride, a sugar additive component solution, and optionally a defoamer solution. The deicing brine blend may include approximately between 222.0 and 64.0 grams of dissolved sodium chloride per liter of the deicing brine blend. The deicing brine blend may include approximately between 34.3 and 240.6 grams of dissolved calcium chloride per liter of the deicing brine blend. The deicing brine blend may be crystallization-free at least until the deicing brine blend is below 10 degrees Fahrenheit.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
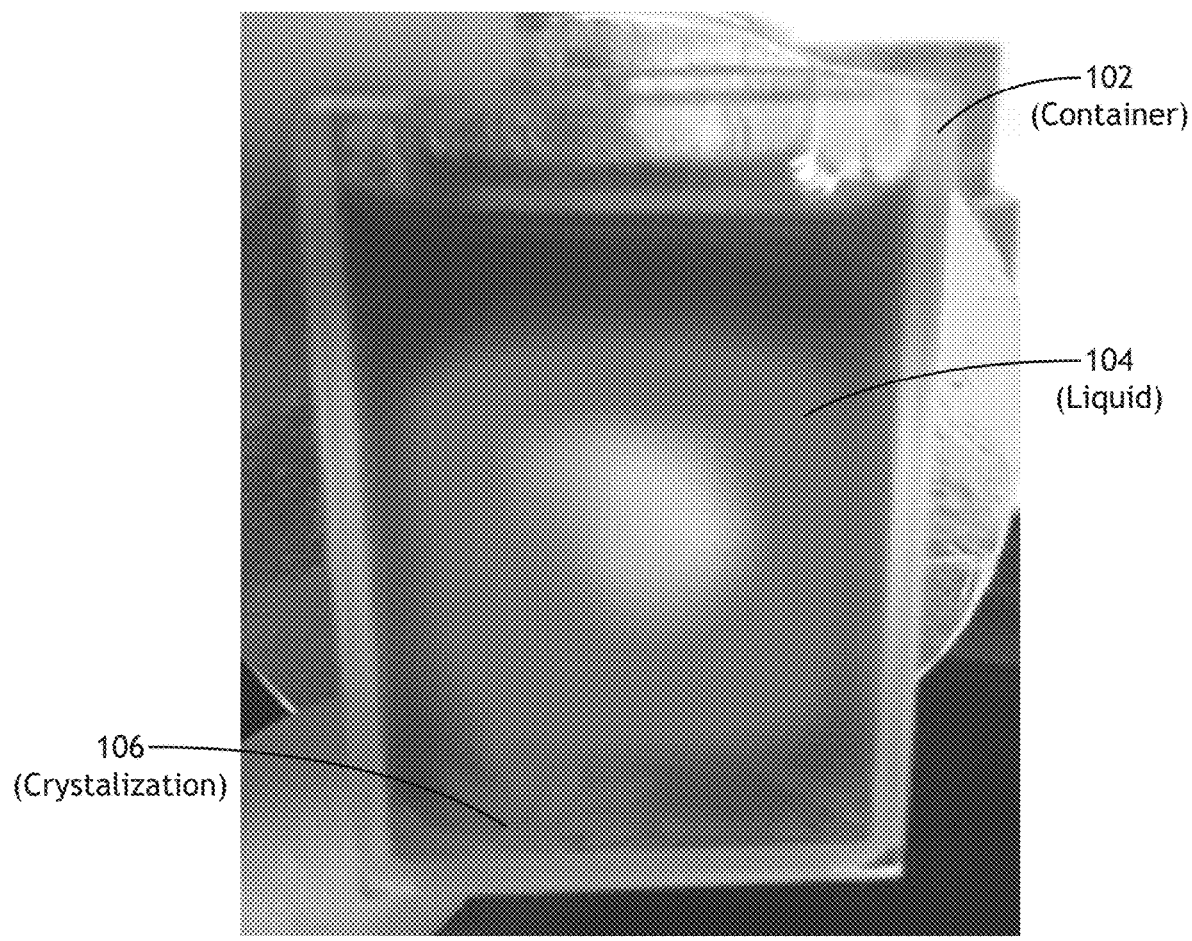
FIG. 1 is a view of crystallization within a deicing brine blend.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to methods of producing deicing brine blends, systems for producing deicing brine blends, and compositions of deicing brine blends.

Embodiments reduce (e.g., eliminate) crystal precipitation when blending aqueous solutions of different salts for application even at extremely cold temperatures.

Embodiments include the blending of sodium chloride and calcium chloride to produce improved (e.g., optimized) brine blends for application in specific temperature ranges. Embodiments reduce (e.g., eliminate) the overuse of infrastructure-destroying chemicals.

Embodiments may include or utilize "full-range" or "complete-range" deicing brine blending such that brine solutions may be produced by blending aqueous solutions of NaCl with aqueous solutions of $CaCl_2$) without any limit on a ratio of the NaCl aqueous solution volume to the $CaCl_2$) aqueous solution volume, and while also avoiding salt crystal precipitation at all target temperatures; for example, brine blends may have any suitable volumetric ratio of NaCl component aqueous solution and $CaCl_2$) component aqueous solution; for example, for one exemplary brine, a ratio of the NaCl aqueous solution volume to the $CaCl_2$) aqueous solution volume may be 1:0; for a second exemplary brine, a ratio of the NaCl aqueous solution volume to the $CaCl_2$) aqueous solution volume may be 0:1; for a third exemplary brine, a ratio of the NaCl aqueous solution volume to the $CaCl_2$) aqueous solution volume may be 1:1; etc. As such, embodiments allow the efficient and economic production of brines that target specific temperature ranges.

Embodiments include a schedule of deicing brine blends. Such blends may be used as an anti-ice treatment (for example, in advance of a winter weather event, such as snow or sleet), as a pre-wet treatment (for example, to activate granular salt applications), as a deicing treatment after snow and/or ice has accumulated, and the like. A particular brine blend may be selected from the schedule of deicing brine blends and produced based on the current temperature, expected temperature range, treatment type, winter weather event, and/or the like. For example, a particular selected brine blend may be selected based on a short term expected temperature range (e.g., a forecasted temperature range over the next 24 hours).

Embodiments include various deicing brine blends, wherein each deicing brine blend includes ingredients in different concentrations and in different amounts per volume of brine solution. The ratios of ingredients may differ in different brine blends intended for application at different surface and/or atmospheric temperatures. In embodiments, the ingredients of the brine blends include some or all of the following active ingredients: sodium chloride, calcium chloride, a sugar (e.g., sucrose (e.g., from a sugar beet processing by-product)), a defoamer (e.g., a fragrance defoamer), and water.

Embodiments may include sodium chloride (NaCl). When dissolved in aqueous solutions of varying densities, sodium chloride molecules break up into two ions that effectively interfere with water crystal formation down to moderately cold temperatures.

Embodiments may include calcium chloride ($CaCl_2$)). When dissolved in aqueous solutions, calcium chloride molecules break up into three ions that effectively interfere with water crystal formation down to extreme cold temperatures.

Embodiments may include a sugar additive, which may include a highly soluble sucrose, (e.g., beet juice, such as Beet 55® manufactured by Smith Fertilizer & Grain). For example, when dissolved in aqueous solutions of a specific density, sucrose inhibits freezing and increases the viscosity of brine blends. Such a sugar additive improves initial and residual deicing effectiveness and inhibits corrosion and leaching.

Embodiments may include a defoamer, such as a fragrance defoamer (e.g., Floramask™ PT manufactured by Florachem Corporation). For example, Floramask™ PT has odor control qualities not previously utilized in the deicing industry. It was discovered that when a particular amount of Floramask™ PT is included in deicing brines of some embodiments, the brine has reduced foam qualities. For example, when dissolved in brine blends at a particular range of ratios, Floramask™ PT controls foam and suppresses salt crystal formation. Floramask™ PT had not been previously been used for defoaming of brine solutions nor had Floramask™ PT previously been used as an odor control agent for deicing brine solutions.

Embodiments may include water ($H_2O$). Liquid water serves as a solvent for non-water ingredients of the brine.

Embodiments may include various deicing brine blends. Each deicing brine blend effectively reduces the freezing point of water (e.g., located where brine has been applied) below a particular target temperature, wherein the particular target temperature is specific to a particular deicing brine blend). In some embodiments, each of the various brine blends may have a constant amount of beet juice and a constant amount of defoamer (e.g., fragrance defoamer); however, blends for colder temperatures (as compared to blends for relatively higher temperatures) may have less sodium chloride and more calcium chloride. That is, for example, for blends designed for successively colder temperature ranges, the volume ratio of NaCl and $CaCl_2$) component solutions may be adjusted in an inversely proportional manner such that NaCl component solution volume decreases while $CaCl_2$) component solution volume increases. In some embodiments, the density of the $CaCl_2$) component solution of each blend may remain constant such that crystallization is avoided entirely by adjusting the density of the NaCl solution for each blend; that is, the density of NaCl may be decreased as $CaCl_2$) volume is increased, and as application temperature is reduced. In other embodiments, the density of the $CaCl_2$) component solution may be adjusted and the density of the NaCl solution may remain constant and/or also be adjusted based on application temperature. While, in some embodiments, various brine blends may have a constant amount of beet juice and a constant amount of defoamer in blends for different temperatures, in other embodiments, amounts of sugar additive (e.g., beet juice) and/or defoamer may be adjusted based on application temperature.

Referring now to FIG. 1, a view of crystallization 106 within a deicing brine blend 104 in a container 102 is depicted.

Embodiments include various blends of deicing brine such that one or more particular deicing brines provide a suitable deicing capability at any particular temperature within naturally occurring winter temperature ranges. Embodiments include deicing brines that may have any suitable concentration ratios of NaCl to $CaCl_2$) such that crystallization of the brine does not occur in and/or on nozzles, sprayers, hoses, pumps, tanks, and/or other equipment. Embodiments may also reduce dust.

In some embodiments, brine blend may comprise a mixture of component solutions, as exemplarily shown in Table 1, below. In some embodiments, such brine blends may also include an added amount of defoamer (e.g., a fragrance defoamer).

For example, a first exemplary brine blend may include approximately 10% (e.g., +/−2%) (by volume) beet juice and approximately 90% (e.g., +/−2%) (by volume) sodium chloride component solution (e.g., a solution of water and sodium chloride) having a specific gravity of approximately 1.179 (e.g., +/−0.003) or having approximately 274.1 grams of NaCl per liter (g/L) of water; in some embodiments, the first blend may also include an added amount of defoamer, which may slightly dilute components of the brine blend. The first blend may be well suited for application to surfaces at temperatures in the approximate range of 14 to 32 degrees Fahrenheit without crystallization of the brine blend (such as in components (e.g., pumps, nozzles, hoses, tanks, etc.) of application equipment).

For example, a second exemplary brine blend may include approximately 10% (e.g., +/−2%) (by volume) beet juice, approximately 81% (e.g., +/−2%) (by volume) sodium chloride component solution having a specific gravity of approximately 1.179 (e.g., +/−0.003) or having approximately 274.1 grams of NaCl per liter (g/L) of water, and approximately 9% (e.g., +/−2%) (by volume) calcium chloride component solution (e.g., a solution of water and calcium chloride) having a specific gravity of approximately 1.294 (e.g., +/−0.005) or having approximately 381.8 grams of $CaCl_2$) per liter (g/L) of water; in some embodiments, the second blend may also include an added amount of defoamer, which may slightly dilute components of the brine blend. The second blend may be well suited for application to surfaces at temperatures in the approximate range of 10 to 13 degrees Fahrenheit without crystallization of the brine blend (such as in components (e.g., pumps, nozzles, hoses, tanks, etc.) of application equipment).

For example, a third exemplary brine blend may include approximately 10% (e.g., +/−2%) (by volume) beet juice, approximately 72% (e.g., +/−2%) (by volume) sodium chloride component solution having a specific gravity of approximately 1.179 (e.g., +/−0.003) or having approximately 274.1 grams of NaCl per liter (g/L) of water, and approximately 18% (e.g., +/−2%) (by volume) calcium chloride component solution having a specific gravity of approximately 1.294 (e.g., +/−0.005) or having approximately 381.8 grams of $CaCl_2$) per liter (g/L) of water; in some embodiments, the third blend may also include an added amount of defoamer, which may slightly dilute components of the brine blend. The third blend may be well suited for application to surfaces at temperatures in the approximate range of 6 to 9 degrees Fahrenheit without crystallization of the brine blend (such as in components (e.g., pumps, nozzles, hoses, tanks, etc.) of application equipment).

For example, a fourth exemplary brine blend may include approximately 10% (e.g., +/−2%) (by volume) beet juice, approximately 63% (e.g., +/−2%) (by volume) sodium chloride component solution having a specific gravity of approximately 1.179 (e.g., +/−0.003) or having approximately 274.1 grams of NaCl per liter (g/L) of water, and approximately 27% (e.g., +/−2%) (by volume) calcium chloride component solution having a specific gravity of approximately 1.294 (e.g., +/−0.005) or having approximately 381.8 grams of $CaCl_2$) per liter (g/L) of water; in some embodiments, the fourth blend may also include an added amount of defoamer, which may slightly dilute components of the brine blend. The fourth blend may be well suited for application to surfaces at temperatures in the approximate range of 2 to 5 degrees Fahrenheit without crystallization of the brine blend (such as in components (e.g., pumps, nozzles, hoses, tanks, etc.) of application equipment).

For example, a fifth exemplary brine blend may include approximately 10% (e.g., +/−2%) (by volume) beet juice, approximately 54% (e.g., +/−2%) (by volume) sodium chloride component solution having a specific gravity of approximately 1.169 (e.g., +/−0.003) or having approximately 258.5 grams of NaCl per liter (g/L) of water, and approximately 36% (e.g., +/−2%) (by volume) calcium chloride component solution having a specific gravity of approximately 1.294 (e.g., +/−0.005) or having approximately 381.8 grams of $CaCl_2$) per liter (g/L) of water; in some embodiments, the fifth blend may also include an added amount of defoamer, which may slightly dilute components of the brine blend. The fifth blend may be well suited for application to surfaces at temperatures in the approximate range of −2 to 1 degrees Fahrenheit without crystallization of the brine blend (such as in components (e.g., pumps, nozzles, hoses, tanks, etc.) of application equipment).

For example, a sixth exemplary brine blend may include approximately 10% (e.g., +/−2%) (by volume) beet juice, approximately 45% (e.g., +/−2%) (by volume) sodium chloride component solution having a specific gravity of approximately 1.164 (e.g., +/−0.003) or having approximately 251.5 grams of NaCl per liter (g/L) of water, and approximately 45% (e.g., +/−2%) (by volume) calcium chloride component solution having a specific gravity of approximately 1.294 (e.g., +/−0.005) or having approximately 381.8 grams of $CaCl_2$) per liter (g/L) of water; in some embodiments, the sixth blend may also include an added amount of defoamer, which may slightly dilute components of the brine blend. The sixth blend may be well suited for application to surfaces at temperatures in the approximate range of −6 to −3 degrees Fahrenheit without crystallization of the brine blend (such as in components (e.g., pumps, nozzles, hoses, tanks, etc.) of application equipment).

For example, a seventh exemplary brine blend may include approximately 10% (e.g., +/−2%) (by volume) beet juice, approximately 36% (e.g., +/−2%) (by volume) sodium chloride component solution having a specific gravity of approximately 1.156 (e.g., +/−0.003) or having approximately 237.4 grams of NaCl per liter (g/L) of water, and approximately 54% (e.g., +/−2%) (by volume) calcium chloride component solution having a specific gravity of approximately 1.294 (e.g., +/−0.005) or having approximately 381.8 grams of $CaCl_2$) per liter (g/L) of water; in some embodiments, the seventh blend may also include an added amount of defoamer, which may slightly dilute components of the brine blend. The seventh blend may be well suited for application to surfaces at temperatures in the approximate range of −10 to −7 degrees Fahrenheit without crystallization of the brine blend (such as in components (e.g., pumps, nozzles, hoses, tanks, etc.) of application equipment).

For example, an eighth exemplary brine blend may include approximately 10% (e.g., +/−2%) (by volume) beet juice, approximately 27% (e.g., +/−2%) (by volume) sodium chloride component solution having a specific gravity of approximately 1.156 (e.g., +/−0.003) or having approximately 237.4 grams of NaCl per liter (g/L) of water, and approximately 63% (e.g., +/−2%) (by volume) calcium chloride component solution having a specific gravity of approximately 1.294 (e.g., +/−0.005) or having approximately 381.8 grams of $CaCl_2$) per liter (g/L) of water; in some embodiments, the eighth blend may also include an added amount of defoamer, which may slightly dilute components of the brine blend. The eighth blend may be well suited for application to surfaces at temperatures in the approximate range of −15 to −11 degrees Fahrenheit without crystallization of the brine blend (such as in components (e.g., pumps, nozzles, hoses, tanks, etc.) of application equipment).

In some embodiments, at least one of the above exemplary brine blends is approximately a eutectic mixture.

Table 1 includes information about the eight exemplary brine blends:

TABLE 1

| Blend | Beet Juice % By Volume | NaCl % By Volume | NaCl Specific Gravity | $CaCl_2$ % By Volume | $CaCl_2$ Specific Gravity | Temp. Range Degrees F | Frequency % |
|---|---|---|---|---|---|---|---|
| 1 | 10 | 90 | 1.179 | 0 | 1.294 | 32 | 14 | 34 |
| 2 | 10 | 81 | 1.179 | 9 | 1.294 | 13 | 10 | 11 |
| 3 | 10 | 72 | 1.179 | 18 | 1.294 | 9 | 6 | 10 |
| 4 | 10 | 63 | 1.179 | 27 | 1.294 | 5 | 2 | 17 |
| 5 | 10 | 54 | 1.169 | 36 | 1.294 | 1 | −2 | 10 |
| 6 | 10 | 45 | 1.164 | 45 | 1.294 | −3 | −6 | 8 |
| 7 | 10 | 36 | 1.156 | 54 | 1.294 | −7 | −10 | 6 |
| 8 | 10 | 27 | 1.156 | 63 | 1.294 | −11 | −15 | 4 |

Table 2 includes information about the sodium chloride of the eight exemplary brine blends:

TABLE 2

| | NaCl | | | |
|---|---|---|---|---|
| Blend | % Component Solution by Volume of Brine Blend | g/L Component Solution | g/L Brine Blend | Specific Gravity of Component Solution |
| 1 | 90 | 274.1 | 246.69 | 1.179 |
| 2 | 81 | 274.1 | 222.021 | 1.179 |
| 3 | 72 | 274.1 | 197.352 | 1.179 |
| 4 | 63 | 274.1 | 172.683 | 1.179 |
| 5 | 54 | 258.5 | 139.59 | 1.169 |
| 6 | 45 | 251.5 | 113.175 | 1.164 |
| 7 | 36 | 237.4 | 85.464 | 1.156 |
| 8 | 27 | 237.4 | 64.098 | 1.156 |

Table 3 includes information about the calcium chloride of the eight exemplary brine blends:

TABLE 3

| | $CaCl_2$ | | | |
|---|---|---|---|---|
| Blend | % Component Solution By Volume of Brine Blend | g/L Component Solution | g/L Brine Blend | Specific Gravity of Component Solution |
| 1 | 0 | 381.8 | 0 | 1.294 |
| 2 | 9 | 381.8 | 34.362 | 1.294 |
| 3 | 18 | 381.8 | 68.724 | 1.294 |
| 4 | 27 | 381.8 | 103.086 | 1.294 |
| 5 | 36 | 381.8 | 137.448 | 1.294 |
| 6 | 45 | 381.8 | 171.81 | 1.294 |
| 7 | 54 | 381.8 | 206.172 | 1.294 |
| 8 | 63 | 381.8 | 240.534 | 1.294 |

The brine blends described with respect to the above table above are merely exemplary, and it is fully contemplated that embodiments may include any of various brine blends that include the exemplary ingredients with same or different resulting concentrations of ingredients. Further, while the sodium chloride component solution and calcium chloride component solution have been described with exemplary concentrations in terms of particular exemplary specific gravities, it is fully contemplated that the amounts (e.g., by volume) and/or concentrations of component solutions may be adjusted to achieve the same or similar resulting concentrations of such exemplary brine blends. Additionally, as used throughout, specific gravity values (with respect to liquids) refer to a ratio of a density of a liquid to a density of water at water's densest temperature (i.e., approximately 39.2 degrees Fahrenheit (4 degrees Celsius)). Further, while the above brine blends have exemplarily described as being a mixture of sodium chloride and calcium chloride component solutions, it is fully contemplated that the crystalized sodium chloride and calcium chloride may be added to and dissolved in corresponding amounts of water and beet juice. Further, as the above described brine blends are merely exemplary, it is fully contemplated that embodiments may include brine blends formulated for other temperature ranges, such as colder temperatures.

Embodiments, such as those described with respect to Tables 1-3, of brine blends cost approximately one-third as much as other currently commercially available products, avoid overuse of infrastructure-destroying chemicals, and perform effectively without crystallization at extremely cold temperatures.

Other existing commercially available products are only offered with higher concentrations of infrastructure-destroying chemicals (such as magnesium chloride and calcium chloride), and are more expensive.

Figure 2:
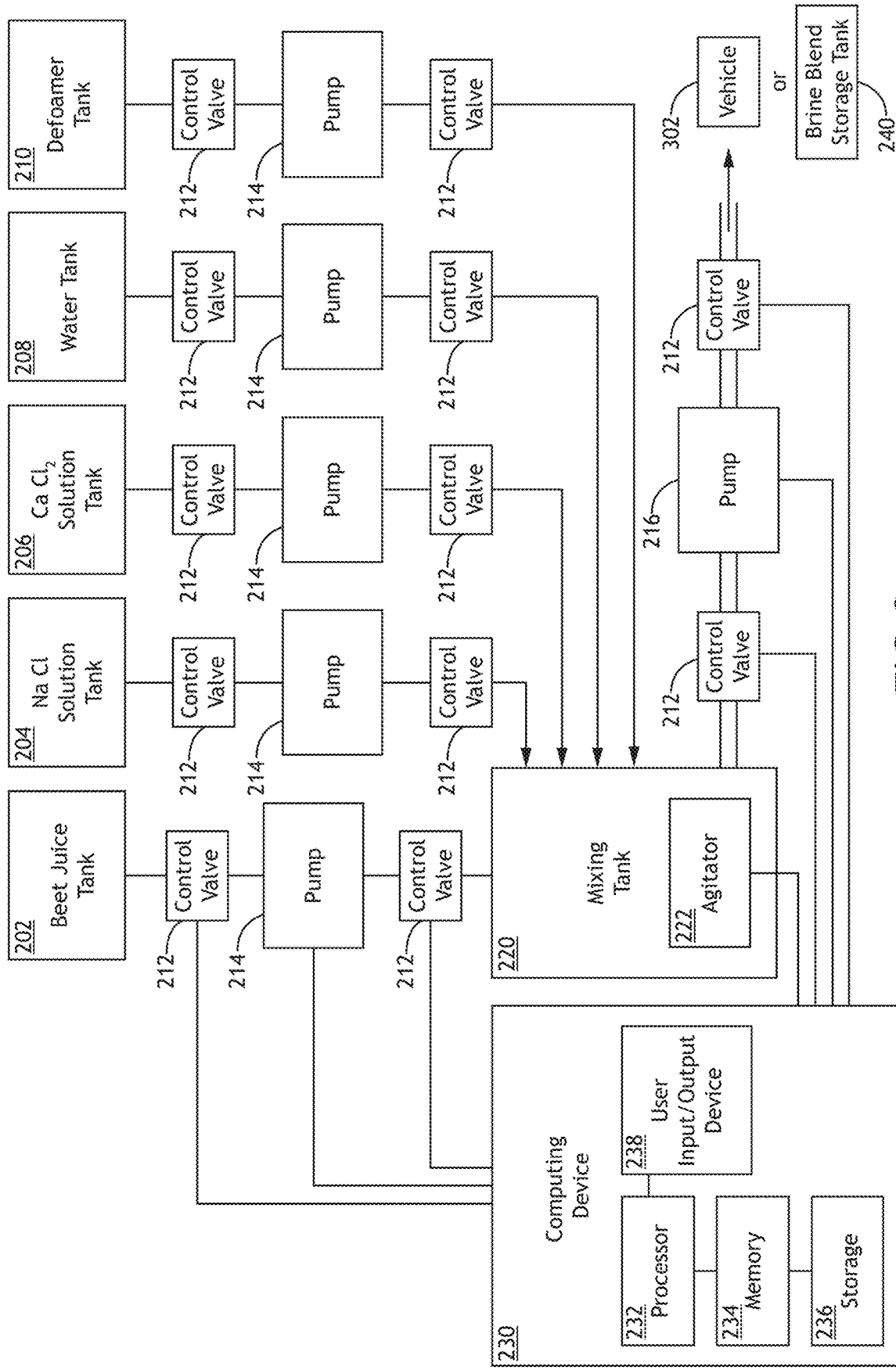
FIG. 2 is a view of an exemplary embodiment of a system according to the inventive concepts disclosed herein.

Referring now to FIG. 2, a view of an exemplary embodiment of a system according to the inventive concepts disclosed herein is depicted. They system may be configured to perform an exemplary method of producing deicing brine blends. The system exemplarily includes a beet juice tank 202, a sodium chloride tank 204, a calcium chloride tank 206, a water tank 208, a defoamer tank 210, a mixing tank 220, vehicle 302, at least one brine blend storage tank 240, at least one computing device 230, control valves 212, and pumps 214, 216. Various components of the system may be mechanically coupled by any of various suitable pipes, hoses, fittings, valves, or the like.

The mixing tank 220 may be configured to receive component solutions from the beet juice tank 202, the sodium chloride tank 204, the calcium chloride tank 206, the water tank 208, and the defoamer tank 210, respectively. In some embodiments, the mixing tank 220 includes an agitator 222. The mixing tank 220 may be configured to produce a brine blend by mixing (e.g., by utilizing the agitator 222) two or more received component solutions received from two or more of the beet juice tank 202, the sodium chloride tank 204, the calcium chloride tank 206, the water tank 208, and the defoamer tank 210. The mixing tank 220 may be configured to provide the brine blend to the vehicle 302 and/or at least one brine blend storage tank 240.

The computing device 230 may be configured to perform any of various operations and execute any of various instructions (e.g., instructions for performing one or more methods), such as disclosed throughout. In some embodiments, the computing device 230 may be or may be implemented as a controller device. The computing device 230 may include at least one processor 232, at least one memory 234, storage 236, and a user input/output device 238, some or all of which may be communicatively coupled. Additionally, while not shown for the sake of clarity, the computing device 230 may be communicatively coupled with any or all of the beet juice tank 202, the sodium chloride tank 204, the calcium chloride tank 206, the water tank 208, the defoamer tank 210, the mixing tank 220, vehicle 302, the brine blend storage tank 240, the control valves 212, the pumps 214, 216, other computing devices (such as via a network), other equipment, or the like.

In some embodiments, a method of producing deicing brine blend may include some or all of the following steps: providing (e.g., via a pump and/or a valve) a predetermined amount of beet juice (e.g., as described within) to a tank; providing (e.g., via a pump and/or a valve) a predetermined amount of sodium chloride component solution (e.g., as described within) to the tank; providing (e.g., via a pump and/or a valve) a predetermined amount (if any) of water to the tank (e.g., to dilute the sodium chloride component solution, if necessary); providing (e.g., via a pump and/or a valve) a predetermined amount of calcium chloride component solution (e.g., as described within) to the tank; providing a predetermined amount of a defoamer (e.g., as described within) to the tank; mixing (e.g., via an agitator) the components to produce a deicing brine. In some embodiments, at least one computing device (e.g., 230) may control one or more pumps (e.g., 214, 216), one or more control valves (e.g., solenoid shut-off valves; e.g., 212), agitators (e.g., 222), and/or the like to electronically control and operate the deicing brine blend production method. The computing device (e.g., 230) may include one or more processors (e.g., 232), memory (e.g., 234), storage (e.g., 236), one or more user input/output devices (e.g., 238; such as a touchscreen display, a keyboard, a mouse, a display, a microphone, and/or the like), and/or the like configured to execute instructions for causing one or more of the pumps (e.g., 214, 216), valves, and agitators (e.g., 222) to perform such a method. Further, the computing device (e.g., 230) may be communicatively coupled with some or all of such pumps, control valves, agitators, other computing devices (e.g., via a network, such as the Internet), and/or the like.

In some embodiments, the computing device (e.g., 230) may receive a user input via the user input/output device (e.g., 238), wherein the user input includes a selected predetermined deicing brine mix. The computing device (e.g., 230) may execute instructions to perform the method for producing the selected deicing brine blend.

In some embodiments, the computing device (e.g., 230) may receive a user input via the user input/output device (e.g., 238), wherein the user input includes an application temperature for a brine blend. The computing device (e.g., 230) may determine a suitable (e.g., optimal based on one or more factors, such as based on least expensive to produce and/or based on availability of ingredients on site) deicing brine blend to produce based at least on the inputted application temperature such that the deicing brine blend will not crystalize at the application temperature. The computing device (e.g., 230) may execute instructions to perform the method for producing the determined deicing brine blend.

Further, in some embodiments, the computing device (e.g., 230) may periodically (e.g., when a winter weather advisory has been issued) receive weather forecast data (e.g., via the internet) that includes winter weather event forecast data (e.g., data indicative of snow and/or ice, temperature forecast data over some time period (e.g., next 24 hours, next 48 hours, or the like)). Based on temperature data obtained from the weather forecast data, the computing device (e.g., 230) may determine a suitable (e.g., optimal based on one or more factors, such as based on least expensive to produce and/or based on availability of ingredients on site) deicing brine blend to produce such that the deicing brine blend will not crystalize at a forecasted application temperature. The computing device (e.g., 230) may execute instructions to perform the method for producing the determined deicing brine blend.

Figure 3:
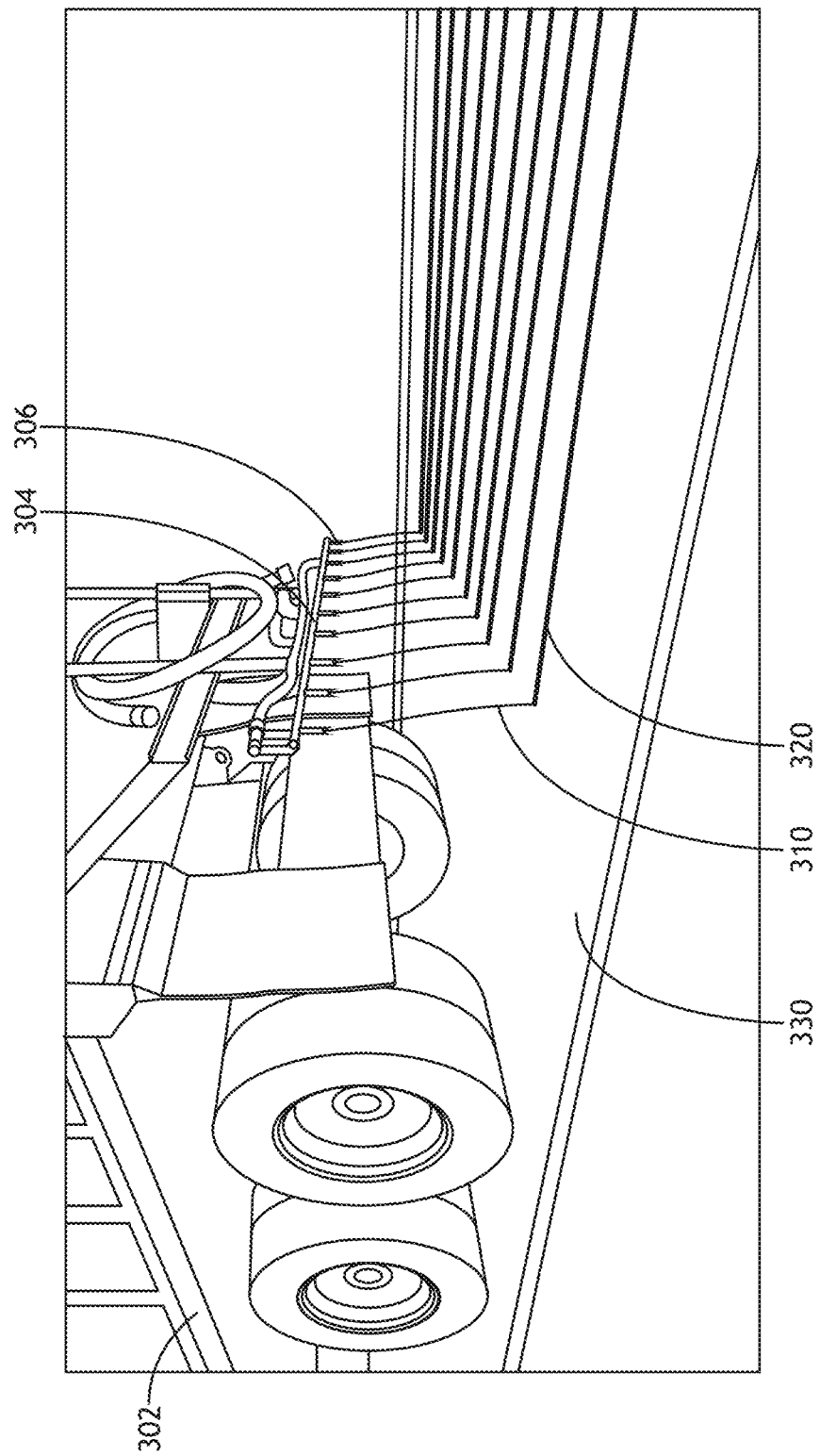
FIG. 3 is a view of an exemplary embodiment of a vehicle applying a deicing brine blend to a surface according to the inventive concepts disclosed herein.

Referring now to FIG. 3, a view of an exemplary embodiment of a vehicle 302 applying a deicing brine blend 320 to a surface (e.g., a road 330) according to the inventive concepts disclosed herein is depicted. The vehicle 302 may include a storage tank (not shown) configured to store the deicing brine blend 320 and sprayer equipment 304 configured to apply (e.g., spray) the deicing brine blend 320 on to the road 330. The sprayer equipment 304 may include one or more nozzles 306 and one or more hoses 310. The applied deicing brine blend 320 may be configured to deice and/or prevent ice from forming on the road 330.

Some embodiments include a method of applying a deicing brine blend to a surface. The method may include any or all of the following: receiving a particular deicing brine blend (e.g., one of the exemplary brine blends 1-8 of the above table) in a storage tank of a vehicle (e.g., a truck or a vehicular trailer); providing (e.g., via a pump) at least a portion of the deicing brine blend through at least one tube (e.g., a hose) to an applicator (e.g., a sprayer, for example, which may include at least one nozzle (which may have any suitable nozzle shape and any suitable nozzle outlet aperture diameter (such as less than or equal to 1 inch, less than or equal to 0.5 inches, less than or equal to 0.25 inches, or the like))); applying (e.g., via the applicator) at least a portion of the deicing brine to a surface (e.g., a road, runway, or parking lot) while the environmental temperature (e.g., outside temperature) is within the particular deicing brine blend's suitable temperature range such that the particular deicing brine blend remains crystallization-free (e.g., at least substantially fully dissolved) as the deicing brine blend travels from the storage tank and through the applicator. Such vehicles may include a storage tank, tubing (e.g., piping, hoses, or the like), nozzles, valves, applicators (e.g., sprayers), a computing device (e.g., a controller device; which may include a processor, memory, storage, a user input/output device, or the like) configured to control and/or execute instructions for carrying out the method, and/or the like to apply the brine blend onto the streets or other desired surfaces (e.g., parking lots or runways). As exemplarily shown in FIG. 3, the vehicle 302 may be configured to perform the method of applying a deicing brine blend (e.g., 320) to a surface (e.g., 330).

Some embodiments may include at least one processor configured to run various software applications or computer code stored in a non-transitory computer-readable medium and configured to execute various instructions or operations, including but not limited to instructions or operations associated with processes, systems, equipment, functions, and methods disclosed throughout. The at least one processor may be configured to run various software applications or computer code stored in a non-transitory computer-readable medium and configured to execute various instructions or operations as disclosed throughout and configured to perform any suitable functions. The at least one processor may be implemented in any number (e.g., at least one, two, or more) of computing devices that may or may not be interconnected over a network (e.g., a local area network (LAN), wireless area network (WAN), the Internet, or a combination thereof) and/or communicatively coupled (e.g., via a network) with other computing devices. Such computing devices may include at least one processor, memory, storage, or the like, and such computing devices may include or be communicatively coupled to any of various suitable sensors configured to measure properties (e.g., temperature, volume, specific gravity, concentration, pressure, flow rate, volume, mass, weight, liquid composition, spectrometer, etc.) associated with systems and processes disclosed throughout.

Figure 4:
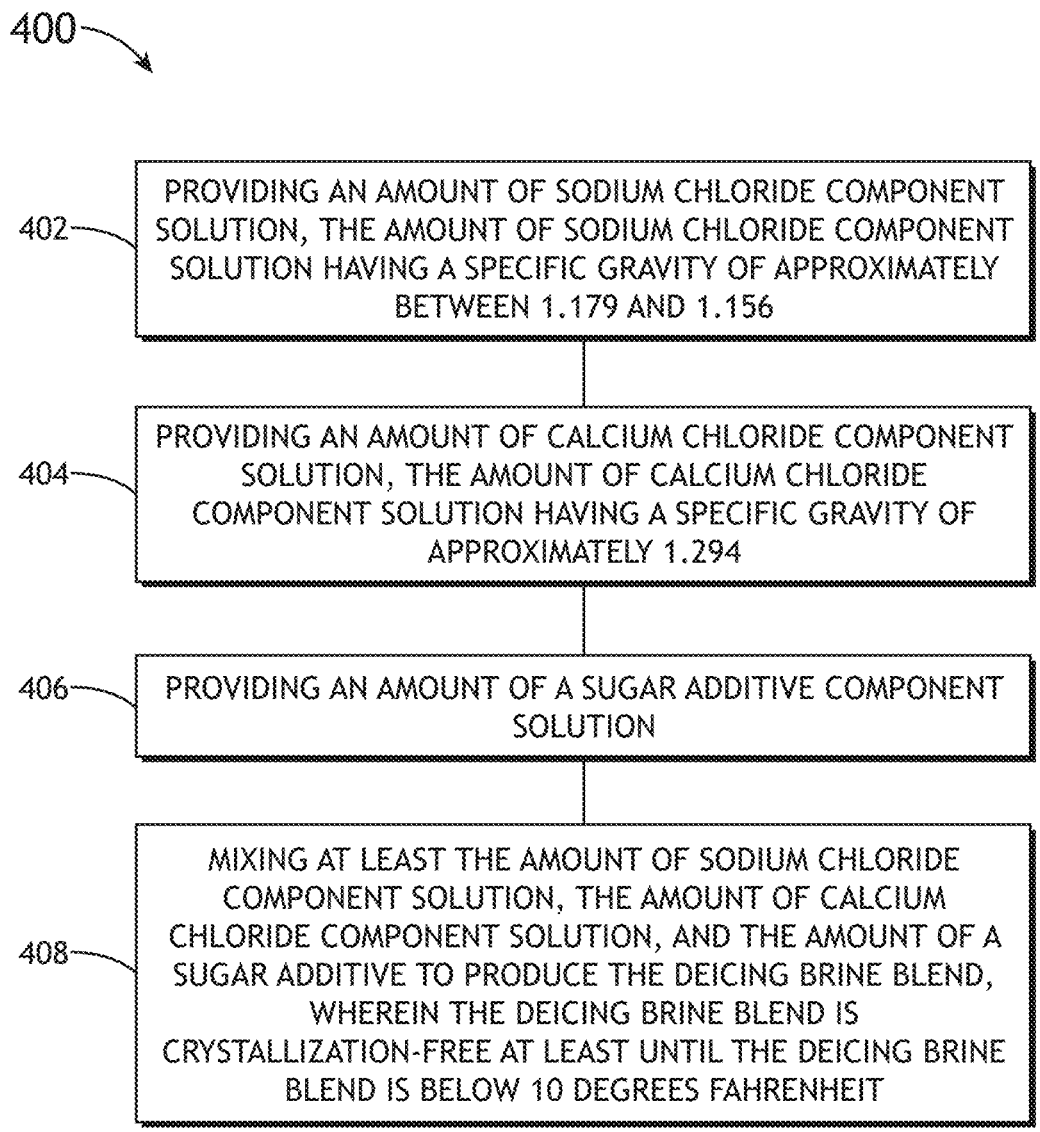
FIG. 4 is a diagram of an exemplary embodiment of a method according to the inventive concepts disclosed herein.

Referring now to FIG. 4, an exemplary embodiment of a method 400 for producing a deicing brine blend according to the inventive concepts disclosed herein may include one or more of the following steps, which, for example, may be controlled and/or performed by any suitable components or stages as disclosed throughout. Additionally, for example, some embodiments may include performing and/or controlling one more instances of the method 400 iteratively, concurrently, and/or sequentially.

A step 402 may include providing an amount of sodium chloride component solution, the amount of sodium chloride component solution having a specific gravity of approximately between 1.179 and 1.156.

A step 404 may include providing an amount of calcium chloride component solution, the amount of calcium chloride component solution having a specific gravity of approximately 1.294.

A step 406 may include providing an amount of a sugar additive component solution.

A step 408 may include mixing at least the amount of sodium chloride component solution, the amount of calcium chloride component solution, and the amount of a sugar additive to produce the deicing brine blend. The deicing brine blend may be crystallization-free at least until the deicing brine blend is below 10 degrees Fahrenheit.

Further, the method 400 may include any of the operations disclosed throughout.

As used throughout and as would be appreciated by those skilled in the art, "at least one non-transitory computer-readable medium" may refer to as at least one non-transitory computer-readable medium (e.g., memory 234, storage 236, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable ROM (EEPROM), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for producing a deicing brine blend, comprising:
   pumps;
   control valves;
   a mixing tank;
   at least one non-transitory computer readable medium; and
   at least one processor communicatively coupled to the at least one non-transitory computer readable medium, wherein the at least one processor is configured to execute instructions to perform a method to produce a deicing brine blend, the method comprising;
      providing an amount of sodium chloride component solution, the amount of sodium chloride component solution having a specific gravity of approximately between 1.179 and 1.156;
      providing an amount of calcium chloride component solution, the amount of calcium chloride component solution having a specific gravity of approximately 1.294;
      providing an amount of a sucrose additive component solution; and
      mixing at least the amount of sodium chloride component solution, the amount of calcium chloride component solution, and the amount of the sucrose additive component solution to produce the deicing brine blend;
   wherein the deicing brine blend is crystallization-free at least until the deicing brine blend is below 10 degrees Fahrenheit.

2. The system of claim 1, wherein the sucrose additive component solution is beet juice.

3. The system of claim 1, wherein the at least one processor is further configured to:
   receive weather forecast data including temperature data; and
   based at least on temperature data of the weather forecast data, determine at least one particular deicing brine blend such that each of the at least one particular deicing brine blend is crystallization-free at a forecasted application temperature, wherein each of the at least one particular deicing brine blend is crystallization-free at least until said particular deicing brine blend is below 10 degrees Fahrenheit.

4. The system of claim 3, wherein the at least one processor is further configured to:
   receive at least one user input including a selected deicing brine blend of the at least one particular deicing brine blend; and
   based at least on the selected deicing brine blend, execute the instructions to perform the method to produce the selected deicing brine blend.

5. The system of claim 1, wherein the at least one processor is further configured to:
   receive at least one user input including a selected predetermined deicing brine blend; and
   based at least on the selected predetermined deicing brine blend, execute the instructions to perform the method to produce the selected predetermined deicing brine blend.

6. A system for producing a deicing brine blend, comprising:
   pumps;
   control valves;
   a mixing tank;
   at least one non-transitory computer readable medium; and
   at least one processor communicatively coupled to the at least one non-transitory computer readable medium, wherein the at least one processor is configured to execute instructions to perform a method to produce a deicing brine blend;
   wherein the deicing brine blend is crystallization-free at least until the deicing brine blend is below 10 degrees Fahrenheit;
   wherein the at least one processor is further configured to:
      receive weather forecast data including temperature data; and
      based at least on temperature data of the weather forecast data, determine at least one particular deicing brine blend such that each of the at least one particular deicing brine blend is crystallization-free at a forecasted application temperature, wherein each of the at least one particular deicing brine blend is crystallization-free at least until said particular deicing brine blend is below 10 degrees Fahrenheit.

7. The system of claim 6, wherein the at least one processor is further configured to:
   receive at least one user input including a selected deicing brine blend of the at least one particular deicing brine blend; and
   based at least on the selected deicing brine blend, execute the instructions to perform the method to produce the selected deicing brine blend.

8. The system of claim 6, wherein the deicing brine blend consists essentially of:
   water;
   dissolved sodium chloride;
   dissolved calcium chloride;
   a sucrose additive component solution; and
   optionally a defoamer solution,
   wherein the deicing brine blend includes approximately between 222.0 and 64.0 grams of dissolved sodium chloride per liter of the deicing brine blend,
   wherein the deicing brine blend includes approximately between 34.3 and 240.6 grams of dissolved calcium chloride per liter of the deicing brine blend.

9. The system of claim 8, wherein the sucrose additive component solution is beet juice.

10. The system of claim 8, wherein the at least one processor is further configured to:
    receive at least one user input including a selected deicing brine blend of the at least one particular deicing brine blend; and
    based at least on the selected deicing brine blend, execute the instructions to perform the method to produce the selected deicing brine blend.

11. The system of claim 8, wherein the at least one processor is further configured to:
    receive at least one user input including a selected predetermined deicing brine blend; and
    based at least on the selected predetermined deicing brine blend, execute the instructions to perform the method to produce the selected predetermined deicing brine blend.

12. A method of preparing a deicing brine blend using the system of claim 6, wherein the deicing brine blend is prepared by a process, comprising:

providing an amount of sodium chloride component solution, the amount of sodium chloride component solution having a specific gravity of approximately between 1.179 and 1.156;

providing an amount of calcium chloride component solution, the amount of calcium chloride component solution having a specific gravity of approximately 1.294;

providing an amount of a sucrose additive component solution; and mixing at least the amount of sodium chloride component solution, the amount of calcium chloride component solution, and the amount of the sucrose additive component solution to produce the deicing brine blend.

13. The method of claim 12, wherein the sucrose additive component solution is beet juice.

14. The method of claim 12, wherein the at least one processor is further configured to:

receive at least one user input including a selected deicing brine blend of the at least one particular deicing brine blend; and based at least on the selected deicing brine blend, execute the instructions to perform the method to produce the selected deicing brine blend.

15. The method of claim 12, wherein the at least one processor is further configured to:

receive at least one user input including a selected predetermined deicing brine blend; and based at least on the selected predetermined deicing brine blend, execute the instructions to perform the method to produce the selected predetermined deicing brine blend.

\* \* \* \* \*